United States Patent Office 3,021,605
Patented Feb. 20, 1962

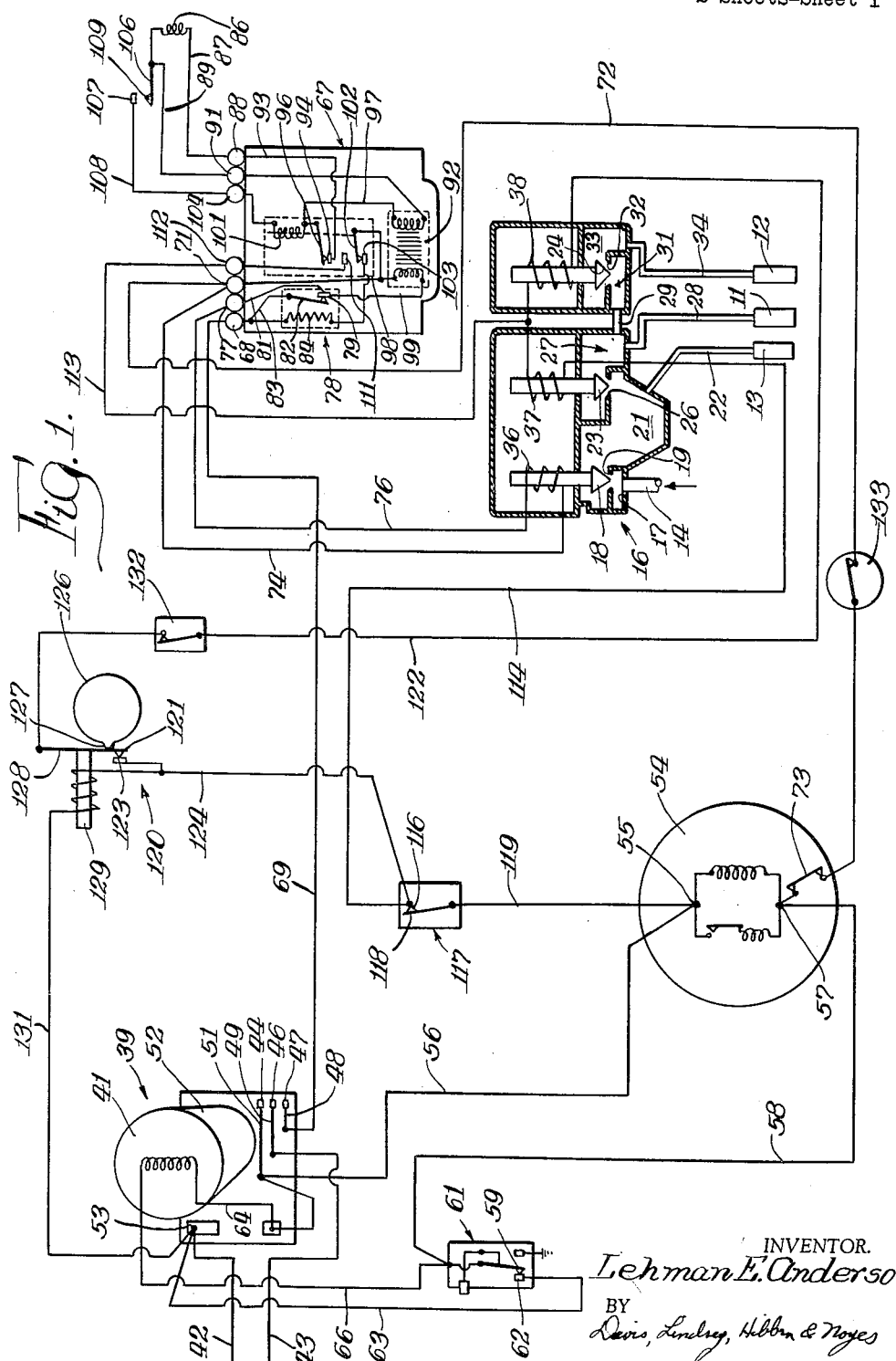

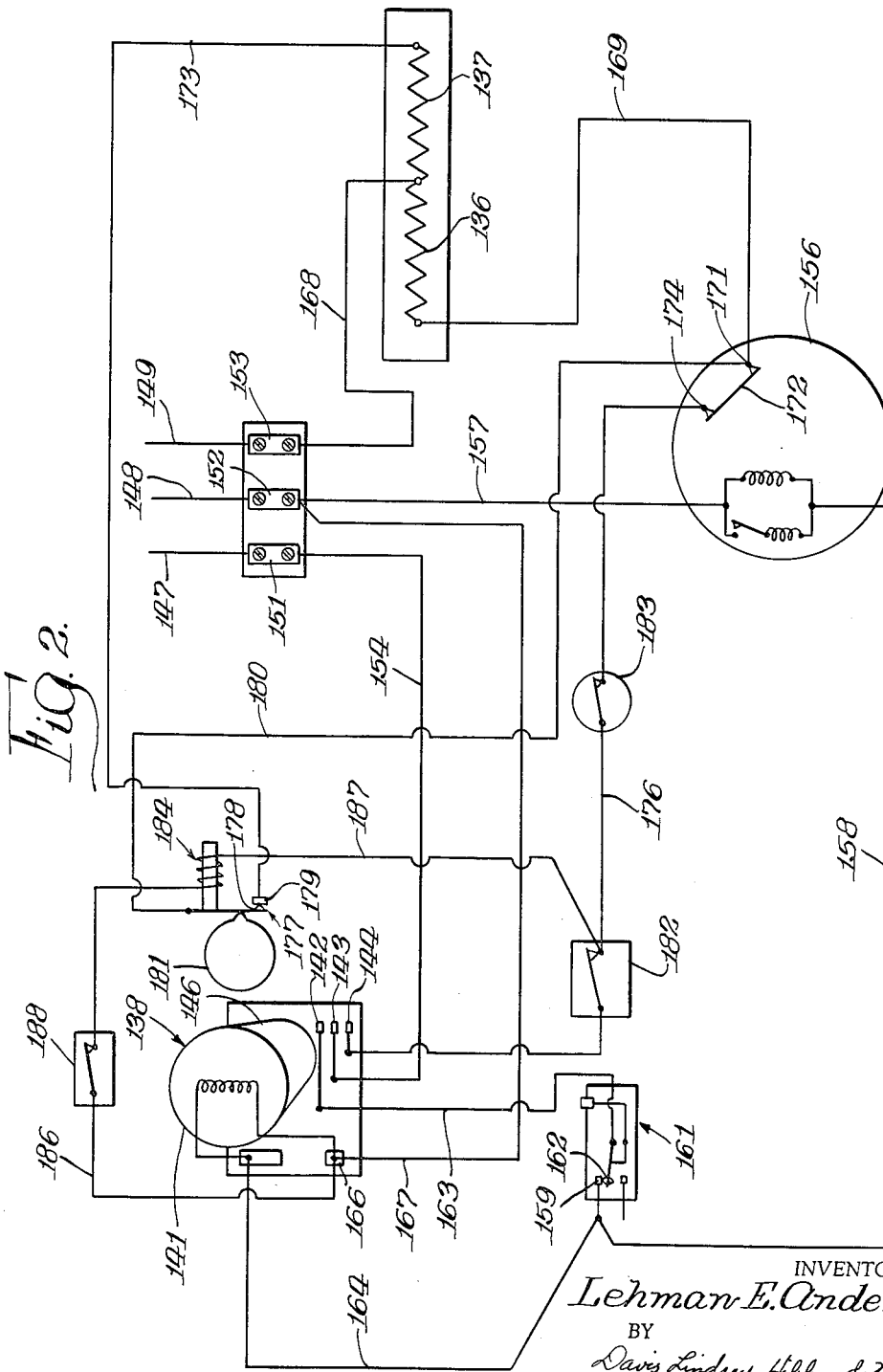

3,021,605
HEATER SYSTEM
Lehman E. Anderson, Two Rivers, Wis., assignor to Hamilton Manufacturing Company, Two Rivers, Wis., a corporation of Wisconsin
Filed July 19, 1957, Ser. No. 673,048
13 Claims. (Cl. 34—45)

This invention relates generally to heater devices and more specifically to a system of heaters and controls for such devices.

In heater devices wherein a temperature is to be maintained at a predetermined level during operation of the device, it is currently common to provide a heater that supplies heat at a fixed rate and a thermostat that cyclically starts and stops the heater as the temperature reaches respectively predetermined upper and lower limits. Since the heat requirements during a cycle of operation may vary, the heater must be sufficiently large to provide the maximum amount of heat required at any part of the cycle for the maximum load. This system is economical to manufacture, easy to service, and can be adapted for use in many different types of specific devices. For example, this system is commonly employed in laundry dryers. In this type of environment, however, when heat requirements are relatively slight, the thermostat must frequently cycle, since heat, when supplied, is supplied at the maximum rate. Therefore, the system may be quite inefficient.

It is a primary object of the present invention to provide a novel heater system which is sufficiently inexpensive for widespread use, yet which is more efficient than the above described system.

Another object is to provide a novel heater system that cyclically supplies heat to maintain a temperature between predetermined limits, the heat being supplied at a high fixed rate during an initial portion of an operating cycle and thereafter being automatically reduced to a lower fixed rate during the remainder of the cycle.

A further object is to provide a novel heater system for laundry dryers that cyclically supplies heat to the dryer, delivering it at a fixed high rate during the initial portion of the drying cycle when clothes are relatively saturated with water and automatically reducing the rate of heat delivered to a lower fixed rate during the remainder of the cycle when the laundry approaches dryness.

Still another object is to provide a novel heater system of the foregoing character for gas heated dryers.

A still further object is to provide a novel heater system of the foregoing character for electrically heated dryers.

Another object is to provide a novel heater system of the foregoing character for laundry dryers, which system is compatible with and embraces the safety and control features that are desirable in dryers.

Other objects and advantages of the invention will become apparent from the following description taken in conjunction with the appended drawings, wherein:

FIG. 1 is a diagrammatic view of a heater system for a gas heated dryer embodying a preferred form of the present invention, and FIG. 2 is a diagrammatic view of a heater system for an electrically heater dryer embodying the preferred form of the invention.

Briefly, the objects of this invention are accomplished by providing a heater system that includes heater means for supplying heat and a thermostat that cyclically deactivates and activates the heater means upon a temperature in the device reaching respective upper and lower predetermined limits. The system also includes novel means for reducing the rate of heat supplied by the heater means during a terminal portion of the operating cycle of the device. Preferably, the latter means is operable in response to the operation of the thermostat after the passage of a predetermined period of the cycle of operation. In the environment of a clothes or laundry dryer, the thermostat and the means for reducing the rate of heat supplied are preferably electrically linked in circuit with one another. From the standpoint of overall simplicity, the heater means preferably comprises a pair of main heaters, both of which are operable at the start of the cycle. By disabling one of the heaters after an initial period of operation, the rate of heat supplied is reduced.

Although the broad concept of this invention has application in other devices, it is believed that this invention will be particularly useful in clothes or laundry dryers. For this reason the invention will be described in that environment. To illustrate the flexibility of this invention, it will be described in connection with a gas heated dryer and an electrically heated dryer.

Structurally, a clothes dryer usually comprises a cabinet enclosing a motor driven, rotatable drum in which the laundry is tumbled during drying. The front of the cabinet is provided with a door that opens into the drum, and through which the laundry is loaded and unloaded. Such dryers usually include means for circulating heated air through the drum, such as a fan or blower, and such fan or blower is driven by the motor that rotates the drum. The air circulated in the drum is ordinarily heated by a heating means utilizing either gas or electricity.

The operation of such dryers is usually automatically controlled by means which includes a timer mechanism that shuts off operation of the dryer after a preselected period of operation. Dryer operation is also governed by devices that provide certain desirable safety features. For example, most dryers are provided with a door-operated device which, when the door is opened, shuts off the drive motor, stops the timer, and cuts off the heat. Also, a high level thermostat is provided for stopping all heating in the event of overheating in the dryer, while a cycling thermostat is provided to maintain the operating temperature within predetermined limits.

The heater systems shown diagrammatically in the drawings illustrate a preferred embodiment of the invention and are adapted to be used in laundry dryers of the gas and electricity heated types. While the rate at which the heat is supplied can be varied in a number of different ways, the present forms of dryer are each provided with a pair of main heaters for supplying the heat to the dryer. The two-heater systems shown are probably less complex, overall, than other types of systems, since the rate of heat supplied can be reduced by simply disabling one of the heaters.

Referring to FIG. 1, the heater system there shown is of the gas heated type and has a pair of main gas burners 11 and 12. For igniting the burners 11 and 12 during the drying cycle, a pilot burner 13 is provided. In this case the pilot burner 13 is of the type that operates throughout the drying cycle and is shut off at the end of the cycle. The pilot burner is disposed adjacent the main burners, of course, so that it may readily ignite them at the proper time. The ignition and operation of the pilot burner 13 will be discussed in more detail hereinafter.

While gas may be supplied to the burners through a number of different types of valve structures, in the present instance gas is supplied by a pipe 14 to a valve structure, shown generally at 16, that controls the gas flow to the various burners. In the valve structure shown, the gas flows from the pipe 14 into an inlet chamber 17. Gas flow from the chamber 17 is controlled by a pilot valve 18 that cooperates with a valve seat 19 formed in the wall of the chamber 17. When the pilot valve 18 is in open position relative to the seat 19, gas flows from the chamber 17 to an intermediate chamber 21. From the latter, the gas flows to the pilot burner 13 through a pipe 22.

Gas flow to the main burners 11 and 12 is controlled by a pair of main valves 23 and 24 respectively. The valve 23 is cooperable with a valve seat 26 formed in the wall of the intermediate chamber 21. When the valve 23 is in open position relative to its seat 26, gas from the chamber 21 flows to another intermediate chamber 27. From the latter, the gas flows through a pipe 28 to the burner 11. Gas from chamber 27 also flows through another pipe 29 into a chamber 31 to the valve 24. The valve 24 is cooperable with a valve seat 32 formed in the wall of the chamber 31. When the valve 24 is in open position relative to its seat 32, gas in the chamber 31 flows into a final chamber 33 and from there through a pipe 34 to the second main burner 12. The above-described series arrangement of the valves 18, 23 and 24 in the gas system insures against the possibility of gas flow to the main burners in the event the pilot valve has not opened. The pilot valve 18 is, therefore, a master control valve which, when closed, seals off all gas flow to the main burners 11 and 12, and gas will not flow thereto even if the latter two valves are in open position. In the present instance, the valves 18, 23 and 24 are individually actuated by solenoids 36, 37 and 38 respectively, each valve being moved to open position upon energization of its associated solenoid.

The dryer has its cycle of operation automatically controlled by a timer, shown generally at 39. The timer 39 is shown as of the type which may be manually set for the desired period of drying cycle. Operation of the timer may be effected by any suitable drive means, but in this instance it is shown as being operated by an electric timer motor 41. In addition to the timer, other elements in the system depend on electric power for their operation. The power for operating the timer motor, as well as such other elements as are discussed hereinafter, may be taken from any suitable source, such as a common 115 volt power line, represented in FIG. 1 by a pair of lines 42 and 43.

The timer 39 includes a switch for controlling the current flow to the various circuit elements. In the present case the switch is of the type having three contacts 44, 46 and 47 carried on deflectable arms 48, 49 and 51 respectively. The arms are disposed adjacent to each other and a rotatable cam 52 is provided for deflecting the arms so that the contacts 44, 46 and 47 make electrical contact with each other. The cam 52 is also a part of the timer mechanism and is rotated by the timer motor 41 during the operating cycle of the dryer. Furthermore, the cam 52 is suitably shaped so that, while it closes the contacts 44, 46 and 47 upon each other substantially simultaneously, it will disengage the contact 46 from the contact 47 a substantial period, such as five minutes, before the contact 44 is disengaged from the contact 46. With this arrangement, as will be shown hereinafter, the portion of the cycle in which heat is supplied ends before the end of the operating cycle and the laundry is tumbled in relatively cool air at the end of the operating cycle. The line 43 is connected to various circuit branches hereinafter described. The line 42 is connected to a fixed terminal 53 on the timer.

The instant dryer is provided with a suitable drive motor 54 for rotating the dryer drum (not shown) and a fan or blower (not shown). A terminal 55 for one side of the windings of the motor 54 is connected to the contact 44 by a conductor 56. A terminal 57 for the other side of the motor windings is connected by a conductor 58 to a movable contact 59 of a door switch 61. The contact 59 is cooperable with a fixed contact 62 and is movable into engagement therewith upon closure of the loading door (not shown) of the dryer, opening of the door disengaging the contact 59 from the contact 62. The contact 62 is connected by a conductor 63 to the terminal 53 on the timer. Thus, it is seen that upon engagement of the contact 44 with the contact 46, when the door is closed, the drive motor 54 is operatively connected across the lines 42 and 43.

The electric timer motor 41 is connected in parallel with the drive motor 54. Thus, one side of the windings of the timer motor 41 is connected by a conductor 64 to the movable timer contact 44. The other side of the timer motor 41 is connected by a conductor 66 to the movable contact 59 of door switch 61, and through the fixed contact 62 and the conductor 63 to the terminal 53. Thus, the timer motor is also connected across the lines 42 and 43 when the contact 44 engages the contact 46 and the dryer door is closed. However, even when the contact 44 is engaged with the contact 46, upon opening of the dryer door, operation of both the drive motor 54 and the timer motor 41 is stopped.

Engagement of the contact 47 in the timer 39 with the contact 46 effects the connection of other branches of the circuit across the lines 42 and 43. Such other branches include the solenoids 36, 37 and 38, a power pack, shown generally at 67, which has means for igniting the pilot burner, a warp switch for stopping dryer operation in the event the pilot burner is not ignited within a predetermined period, and means for preventing the opening of the main valves 23 and 24 prior to the ignition of the pilot burner.

The power pack 67 has a terminal 68 that is connected to the power line 43 through contact 47 of the timer switch by a conductor 69. Another terminal 71 of the power pack 67 is connected by a conductor 72, through a motor throw-out switch 73 on the motor 54, to the terminal 57 on the motor. Being connected to the terminal 57, the terminal 71 is thus connected through the conductor 58, the door switch 59, the conductor 63 and the terminal 53 on the timer to the power line 42. Hence, elements connected between the terminals 68 and 71 on the power pack are connected across the lines 42 and 43 when the contacts 46 and 47 are closed.

One purpose of the power pack 67 is to control the operation of the pilot valve 18 and the ignition of pilot burner 13 at the beginning of a cycle of operation. To this end, one side of the pilot solenoid 36 is connected by a conductor 74 to the terminal 71 on the power pack. The other side of the solenoid 36 is connected by a conductor 76 to a terminal 77 on the power pack 67. The terminals 68 and 77 are interconnected through a warp switch, shown generally at 78. With the warp switch closed, engagement of the contact 46 with the contact 47 energizes the solenoid 36 and opens the pilot valve 18.

The warp switch 78, above mentioned, is a protection device for deenergizing the solenoid 36 and other elements of the circuit in the event the pilot burner 13 does not become ignited within a predetermined period after the start of a cycle of operation. The warp switch shown herein comprises a heat responsive switch having a fixed contact 79 that is connected by a conductor 81 to the terminal 77, and a movable contact 82 that is connected by a conductor 83 to the terminal 68. The movable contact 82 normally engages the fixed contact 79 but moves to disengage the fixed contact 79 upon being heated to a predetermined temperature. The remaining element in the warp switch 78 is a heater element 84 connected in parallel with the contacts 79 and 82. The heater 84 is so proportioned and positioned relative to the heat responsive switch that a predetermined period of heating raises the temperature of the switch sufficiently to open its contacts 82 and 79. The remaining connections for the heater 84 are such that the heater 84 will be deenergized as soon as the pilot burner 13 is ignited. Therefore, the warp switch 78 opens only if the pilot fails to ignite within a predetermined period. Opening of the warp switch deenergizes the pilot solenoid 36 and other elements in the power pack, hereinafter described.

As previously mentioned, the pilot burner 13 is of the type that is reignited at the beginning of each operating cycle. In order to ignite the pilot burner 13, the power pack 67 is connected to a glow coil 86 that is positioned adjacent the pilot burner 13. The glow coil 86 is energized through the power pack, one side of the glow coil being connected by a conductor 87 to a terminal 88 on the power pack, and the other side of the glow coil 86 being connected by a conductor 89 to another terminal 91. The terminal 91 is in turn connected to one side of the secondary of a transformer 92 in the power pack 67 and the terminal 88 is connected through a normally closed switch of a relay 101, to the other side of the secondary of the transformer 92. For this purpose a conductor 93 interconnects the terminal 88 and a fixed contact 94 of the relay actuated switch. Cooperable with the fixed contact 94 is a movable contact 96 of the relay switch, and the contact 96 is connected by a conductor 97 to the said opposite side of the secondary of the transformer 92. The primary of the transformer 92 is connected across the terminals 71 and 68 of the power pack, one side being connected by a conductor 98 to the terminal 71 and the other side by a conductor 99 to the fixed contact 79 of the warp switch, and through the warp switch and the conductor 81 to the terminal 68. As long as the contacts 79 and 82 of the warp switch remain engaged during the cycle of operation, the transformer 92 remains energized. From the foregoing it is clear that upon engagement of the contact 46 with the contact 47 in the master switch of the timer 39 at the beginning of the drying cycle, the pilot valve 18 is opened and the glow coil 86 is energized.

As soon as the pilot burner 13 has been ignited the main valves 23 and 24 are opened, the glow coil 86 is disconnected and the heater 84 of the warp switch is disconnected from the circuit. The foregoing are additional functions performed in the power pack 67. They are accomplished by the relay 101 that actuates the movable switch contact 96. In addition to actuating the movable contact 96, the relay 101 also actuates a second movable contact 102 that normally engages a fixed contact 103, connected in series with the heater 84 of the warp switch. The movable contact 102 is connected to the conductor 98. One end of the coil of the relay 101 is connected to the conductor 97 while the other end of the coil is connected to a terminal 104. Upon energization of the relay 101, the movable contact 96 is moved from the fixed contact 94, deenergizing the glow coil 86. The same action of the relay 101 moves with movable contact 102 from the fixed contact 103 to another fixed contact 111 that is connected to a terminal 112. This latter action disrupts the circuit through the heater 84 of the warp switch and energizes the solenoids 37 and 38 for the main burners, as will be more fully discussed hereinafter.

The relay 101 is energized by the transformer 92 upon closure of a heat responsive, normally open switch 106 which is positioned to be responsive to the heat generated by the pilot burner 13. A fixed contact 107 of the switch 106 is connected to the terminal 104 by a conductor 108, and a movable contact 109 cooperable with the fixed contact 107 is connected to the conductor 89 and through it to the terminal 91. Upon ignition of the pilot burner 13 the heat responsive switch closes its contacts 107 and 109 and the relay 101 is thereby connected across the secondary of the transformer 92.

As previously mentioned, energization of the solenoids 37 and 38 of the main burners is effected upon movement of the movable contact 102 into engagement with the fixed contact 111 by the relay 101, the fixed contact 111 being connected to the terminal 112 on the power pack 67. The terminal 112 is, in turn, connected by a wire 113 to interconnected ends of the solenoids 37 and 38. The end of the solenoid 37 opposite its interconnected end is connected by a conductor 114 to a fixed contact 116 of a normally closed, heat responsive switch or thermostat, indicated generally at 117. The movable contact 118 of the thermostat 117 is, in turn, connected by a conductor 119 to the drive motor terminal 55. The solenoid 38 is connected in parallel with the solenoid 37 through other conductors to the fixed contact 116 of the thermostat 117. Thus, upon engagement of the movable contact 102 with the fixed contact 111, the solenoids 37 and 38 are connected in parallel across the lines 42 and 43 through the thermostat 117 and are energized.

After the drying cycle has progressed a predetermined length of time and the moisture content of laundry being dried has decreased, it is desirable to reduce the rate that heat is supplied by the heaters 11 and 12. This effect is conveniently accomplished in the present instance by means that disables one of the heaters, in this case the burner 12, for a remaning or terminal portion of the cycle. The means for disabling the heater 12 comprises a normally open switch 120. The switch has a movable contact 121 biased to an open position and connected by a conductor 122 to the side of the solenoid 38 opposite its connection with the conductor 113. The movable contact 121 is engageable with a fixed contact 123 that is connected by a conductor 124 to the fixed contact 116 of the thermostat.

In order that the burner 12 be operable along with the burner 11 during the early port on of the drying cycle, the movable contact 121 of the switch 120 is moved into engagement with the fixed contact 123 upon initiation of the drying cycle. This action is accomplished by another rotatable cam 126 in the timer. The cam 126 is rotated by the timer motor 41 simlarly to the rotation of the cam 52. The cam 126 is positioned to effect operat.ve engagement of the switch 120 and is provided with a radially projecting lobe 127 for camming the contact 121 into engagement with the contact 123 when the timer 39 is set to initiate a drying cycle. As the drying cycle progresses the timer motor 41 rotates the cam 126 relative to the contact 121 so that it eventually releases the same. After the contact 121 is released by the cam 126, the switch 120 tends to open. Opening of the switch 120 disables the burner 12 so that it can no longer supply heat during the remainder of the drying cycle.

Inasmuch as there is often considerable variation in the quantity and wetness of laundry that may be dried, it is desirable that great flexibility in the operation of the burner 12 be provided. In other words, it is desirable that the burner 12 operate for a longer period when the laundry is relatively large in quantity and wet or for a shorter period when the laundry is relatively small in quantity and dry. The present invention takes advantage of the fact that the action of the thermostat 117 is a measure of these variables. The thermostat 117 is positioned so that it will be responsive to the temperature of the circulated air discharged after it has passed through the dryer drum, and is arranged to open the burner circuits upon the aforesaid temperature reaching a predetermined upper limit. As drying progresses and the laundry approaches dryness, the temperature of the discharged air approaches the upper limit since there is less heat used in vapor zing the moisture. The period for that temperature to rise sufficiently to open the thermostat is therefore a function of the quantity and wetness of the laundry.

Consequently, in the present instance, the opening of the thermostat 117 is used in conjunction with the switch 120 to effect disablement of the burner 12. More specifically, an electromagnet, the energization of which is dependent on the operation of the thermostat 117, is used to hold the contacts 121 and 123 in engagement after the cam 126 has released the movable contact 121. The movable contact 121 is carried by an arm 128 of magnetic material, and an electromagnet 129 is positioned adjacent the arm 128 for holding the aforementioned contacts closed when the cam 126 has rotated away from its holding posit on. One side of the coil of the electromagnet is connected by a conductor 131 to the terminal 53 of the timer. The other side of the coil of the electromagnet is connected to the conductor 124 and through it to the fixed contact 116 of the thermostat. Thus, the electromagnet 129 is connected across the lines 42 and 43 and is energized when the thermostat 117 is closed during the operating cycle, and is deenergized when the thermostat 117 is open. The electromagnet 129 is so proportioned and positioned relative to the arm 128 that it is capable of holding the contact 121 in engagement with the contact 123 when such engagement has been effected by the cam 126, but is incapable of moving the arm 128 against its bias once the switch has opened. In other words, the electromagnet is simply a releasable holding device.

It is often desirable that dryers of the foregoing character be operated only at "low heat." To this end a manually operable switch 132 is connected in the line 122. When the switch 132 is open the solenoid 38 is deenergized, even though the switch 120 may be closed. Also, it is often desirable to provide an additional safety device to protect against the possibility of overheating in the dryer. In the instant case a high-level thermostat switch 133 is connected in the conductor 72. The thermostat 133 is positioned to be responsive to another temperature in the dryer, and opens when that temperature reaches a predetermined upper limit. Opening of the thermostat 133, by virtue of its being connected in the conductor 72, of course, effects deenergization of the power pack 67 and, hence, effects the closure of the valves 18, 23 and 24.

In order to operate the dryer after it has been loaded with laundry and the door closed, the timer 29 is manually set for the desired period of operation. Upon setting the timer, the cam 52 engages the arm 51 and deflects it, and thereafter the arm 49, so that the contacts 44, 46 and 47 mutually engage. Also, the cam 126 closes the switch 120. Closing of the contact 44 on the contact 46 energizes the electromagnet 129, starts the drive motor 54 and also starts the timer motor 41. Closure of the contact 46 on the contact 47 energizes the pilot solenoid 36, opening the pilot valve 18, and energizes the transformer 92. The relay 101 being initially deenergized, its movable contact 96 engages the fixed contact 94 and the glow coil 86 is energized. Also, the movable contact 102 is initially in engagement with the fixed contact 103, and the heater 84 of the warp switch is energized and commences to heat the switch element 82.

Assuming that the pilot burner 13 is properly ignited by the glow coil 86, heat from the pilot burner 13 quickly closes the heat responsive switch 106. Upon closure of the switch 106, the relay 101 is energized and it moves the contact 96 from engagement with the contact 94 and at the same time, it moves the contact 102 out of engagement with the contact 103 and into engagement with the contact 111. This action opens the glow coil circuit, opens the circuit to the heater 84 and closes the circuit through the conductor 113 to the solenoids 37 and 38. Energization of the solenoids 37 and 38 opens the valves 23 and 24 for admitting gas to the main burners 11 and 12.

As soon as gas reaches the main burners 11 and 12 it is ignited by the pilot burner 13. The burners 11 and 12 continuously supply heat at a fixed rate until the temperature of the air, after it leaves the dryer drum, reaches a predetermined upper limit. When this upper limit has been reached, the thermostat 117 opens. Opening of the thermostat 117 deenergizes the solenoids 37 and 38, allowing the valves 23 and 24 to close. Furthermore, opening of the thermostat 117 deenergizes the holding electromagnet 129. Ordinarily, the opening of the thermostat 117 will not occur until after the passage of a substantial period of time. During the passage of such a period of time, the cam 126 will have rotated sufficiently to release the arm 128 of the disabling switch. Therefore, the opening of the thermostat 117 allows the bias on the arm 128 to move the contact 121 out of engagement with the contact 123. This action effectively disables the main burner 12 so that it will no longer operate during the remainder of the drying cycle. Since the pilot solenoid 36 is not in the same line with the thermostat 117, the pilot burner 13 continues to burn even though the thermostat 117 is open.

Continued operation of the blower will cause the temperature of the air leaving the drum to gradually decrease. Upon the temperature reaching a predetermined lower limit the thermostat 117 closes. Closure of the thermostat 117 reenergizes the electromagnet 129 and the main solenoid 27. Thus, the valve 23 will again open, causing the heater to again supply heat. Although the electromagnet 129 is again energized, its strength is insufficient to move the arm 128 against its bias and the contact 121 remains disengaged from the contact 123.

In the absence of other circumstances, after the first operation of the thermostat 117, the burner 11 cyclically supplies heat in accordance with the opening and closing of the thermostat 117. A predetermined period before the end of the drying cycle, the cam 52 of the timer 39 will have moved sufficiently to permit the contact 46 to move out of engagement with the contact 47 without disrupting the engagement between contacts 44 and 46. This action opens the circuit to the pilot solenoid 36, causing the pilot valve 18 to close. Closure of the pilot valve 18 cuts off all gas supply to the burners and, hence, terminates heating. Thereafter, only the drive motor 54 and the timer motor 41 continue to operate. In this way the laundry continues to be tumbled, but in cooler air, until the end of the cycle. The termination of all heating is usually made to occur a substantial period, such as five minutes, before the end of the operating cycle.

The operating cycle terminates upon the expiration of the period initially set on the timer. At such time the cam 52 of the timer 39 will have moved sufficiently to allow the contact 44 to disengage the contact 46. Upon this latter disengagement all dryer operations cease.

In the event the dryer door is opened during the operating cycle, the door switch 61 opens the circuits of all of the electrical elements except the circuit through the electromagnet 129. Thus, opening of the dryer door terminates dryer operation until the door has been reclosed. Since the electromagnet 129 is not deenergized by the opening of the door, its operative relationship with respect to the thermostat 117 remains unchanged. In other words, if the thermostat 117 has not been previously opened, upon closure of the door the operating cycle will proceed substantially as above described. However, if the thermostat 117 had opened prior to the opening of the door, upon closure of the door only the main burner 11 will be reignited.

In the event the motor 54 should stop for any reason it is possible for the dryer to become overheated. To cover this contingency, the motor throw-out switch 73 is connected in series in the line 72 and is arranged to open the line 72 when the motor 54 stops. This action effects deenergization of the power pack 67 and hence, the solenoids 36, 37 and 38.

Referring to FIG. 2 of the drawing, the heater system there shown illustrates the invention in connection with an electrically heated laundry dryer. Although this system is basically the same as that previously described, the electrical system is substantially simpler, structurally speaking. Although adaptable to any power source the system illustrated uses a common three wire, 230 volt power source. As in the case of the gas dryer previously described, a pair of heaters are employed for heating the circulated air in the dryer. In this case, the heaters are 230 volt resistance heaters 136 and 137.

The cycle of operation of the instant dryer is automatically controlled by a timer, shown generally at 138, which is substantially the same as the timer 39. The timer 138, like the timer 39, is driven by a 115 volt electric motor 141 and has a cam-operated switch having contacts 142, 143 and 144 that are deflectable to close upon each other by a cam 146, in the same manner as that described in connection with the gas dryer system.

The power for operating the various elements of the dryer can be taken from any suitable three wire, 230 volt source such as the lines 147, 148 and 149. 115 volts is provided across adjunct lines 147—148 and 148—149 and 230 volts is provided across lines 147—149. The lines 147, 148 and 149 are connected to terminals 151, 152 and 153 respectively. The terminal 151 is connected by a conductor 154 to the contact 143 of the cam-operated switch.

The instant dryer is, also, of course, provided with a suitable 115 volt drive motor 156 for rotating a dryer drum (not shown) and a blower (not shown). One side of the windings of the motor 156 is connected by a conductor 157 to the terminal 152 and the opposite side of the motor windings is connected by a conductor 158 to a fixed contact 159 of a door switch 161. The door swtich is like the previously described door switch 61 and has a movable contact 162 engageable with the contact 159, that is connected by a conductor 163 to the cam-operated switch contact 142. The movable contact 162 is arranged to engage the fixed contact 159 upon closure of the dryer loading door (not shown), and to disengage the fixed contact 159 upon opening of the door. From the foregoing it is clear that, with the dryer door closed, upon engagement of the contact 142 with the contact 143 the motor 156 is connected across the 115 volt terminals 151 and 152.

The timer motor 141 is likewise connected, through the door switch 161 and across the 115 volt terminals 151 and 152. One side of the timer motor is connected by a conductor 164 to the fixed contact 159 of the door switch, and through the door switch and the conductor 163 to the contact 142. The other side of the timer motor is connected to a terminal 166, which, in turn, is connected by a conductor 167 to the terminal 152. Thus, the timer motor 141 operates only when the door is closed and when the contact 142 engages the contact 143 of the timer switch.

The contact 144 of the timer switch controls the 230 volt heater circuit. The heaters 136 and 137 are connected by a common conductor 168 to the terminal 153. They are connected through parallel branches to the contact 144 and upon closure of the contact 143 on the contact 144, through the line 154 to the terminal 151.

The end of the heater 136 opposite its connection with the conductor 168, is connected by a conductor 169 to a contact 171 of a motor throw-out switch 172. The corresponding end of heater 137 is connected by a parallel conductor 173 through other connections to the same contact 171 of the motor throw-out switch 172. The other contact 174 of the motor throw-out switch 172 is connected by a conductor 176 to the contact 144. The motor throw-out switch 172 interconnects its contacts 171 and 174 when the motor reaches a predetermined speed. Therefore, upon closure of the cam-operated switch contacts, first the motor 156 is energized and thereafter the motor throw-out switch 172 closes and effects energization of the heaters 136 and 137.

For the same purposes outlined in connection with the gas heated dryer, the instant dryer is provided with means that disables one of the heaters for a terminal portion of the drying cycle. In the present instance the heater 137 is disabled. The means for disabling the heater 137 is substantially the same as that previously described in connection with the gas dryer and comprises a switch 177 having a movable contact 178 for making contact with a fixed contact 179, which is connected through the conductor 173 to the heater 137. The movable contact 178 is biased to the normally open position and is connected by a conductor 180 to the contact 171 of the motor throw-out switch.

In order that the heater 137 may be operable along with the heater 136 during the initial portion of the drying cycle, the movable contact 178 is moved into engagement with the fixed contact 179 by another timer actuated cam 181, which operates in the same manner as the cam 126 operated in the previously described system.

The instant system includes a control thermostat for cyclically opening and closing the connections to the heaters as the temperature in the dryer reaches respective predetermined upper and lower limits. In this case a thermostat 182 is connected in series with the heaters 136 and 137 in the conductor 176. In addition, for protecting against the contingency of overheating in the dryer, a high level thermostat 183 is provided. The high level thermostat is also connected in series in the line 176.

The instant system also includes an electromagnet, shown generally at 184, for holding the switch 177 closed after it has been released by the cam 181 so that the heater 137 will not be disabled until the thermostat 182 has opened. The connections for the electromagnet 184 are substantially the same as in the previously described system. Thus, one side of the coil of the electromagnet is connected by a conductor 186 to the timer terminal 166, and hence to the terminal 152, and the other side of the coil is connected by a conductor 187 to the thermostat 182 and hence by the conductor 176 to the contact 144 of the timer switch. The latter connection is made through the control thermostat 182 so that upon opening of the thermostat 182, the electromagnet 184 will be deenergized along with the heaters 136 and 137, and will release the contact 178.

A manually operable switch 188 is connected in series with the coil of the electromagnet 124 so that the latter may be eliminated from the circuit when only low heat operation is desired. Because of its placement in the conductor 186 opening of the switch 188 does not immediately disable the heater 137 at the beginning of the operating cycle, as does its counterpart, switch 132, in the first described system. With the switch 188 open, the heater 137 will be energized only for the period of time the cam 181 holds the switch 177 closed. Of course, the cam 181 can be formed to hold the switch 177 closed for any desired period of time, but in the instant cast the shape of the cam is such that the switch is held closed for a relatively short period.

The operaitng cycle of the instant system is similar to that described in connection with the gas dryer system. After the dryer has been loaded and its door closed the timer 138 is set for the desired period of operation. As the timer is set, the cam 138 closes the contacts 142, 143 and 144 for starting the operation. At the same time, the cam 181 closes the disabling swich 177. Upon engagement of the contact 142 with the contact 143, the drive motor 156 and the timer motor 141 are energized and begin to run. As the drive motor comes up to speed, its motor throw-out switch 172 closes, connecting the conductors 169 and 176 for energizing the heaters. Engagement of the contact 143 with the contact 144 energizes the electromagnet 184, and, after the closure of the motor throw-out switch 172, connects the heaters 136 and 137 across the 230 volt terminals 151 and 153.

The heaters 136 and 137 supply heat at a fixed rate to the air circulated through the dryer drum. As drying progresses the temperature of the circulated air leaving the dryer drum slowly increases to a predetermined upper limit, as above described. When this upper limit has been reached, the thermostat 182 opens, deenergizing the heaters 136 and 137 and the electromagnet 184. By this time the cam 181 will have been rotated sufficiently to become disengaged from the contact 178 of the switch 177. Upon the deenergization of the electromagnet 184 the switch 177 opens, disabling the heater 137 for the remainder of the drying cycle.

Continued operation of the blower will cause the temperature of the air leaving the drum to slowly decrease. Upon the temperature reaching a predetermined lower limit the thermostat 182 closes, reconnecting the electromagnet 184 and the heater 136. Although the electromagnet 184 is reenergized, its strength is insufficient to move the arm 178 against its bias, and the heater 137 remains deenergized. After the first operation of the thermostat 182, the heater 136 will cyclically supply heat to the system as the thermostat 182 opens and closes.

Near the end of the drying cycle the cam 146 will have moved sufficiently to permit the contact 143 to move out of engagement with the contact 144 while holding the contact 142 in engagement with the contact 143. Disengagement of contact 143 from the contact 144 terminates the operation of the heater 136 for the remainder of the drying cycle. Thereafter, only the drive motor 156 and the timer motor 141 continue to operate and in this way the laundry continues to be tumbled in cooler air the remainder of the cycle and until the cam 146 moves sufficiently to permit the contact 142 to disengage from the contact 143. Upon such disengagement all dryer operations cease.

The door switch 161 operates in substantially the same way as the door switch 61 in the previously described system. In the event the dryer door is opened during the drying cycle, the door switch 161 opens all branches of the electric circuit except that through the electromagnet 184. Thus, opening of the dryer door terminates dryer operations until the door has been reclosed. Since the electromagnet 184 is not deenergized by the opening of the door, its operative relationship with respect to thermostat 182 remains unchanged, as previously described. The motor throw-out switch 172 and the high level thermostat 183 also perform the same functions as outlined with respect to their counterparts in the previously described system.

From the foregoing, it is apparent that this invention provides a novel heating system for heater devices such as laundry dryers and the like. The system is such that it appropriately decreases the rate of heat supplied at a time when high level heat input is no longer needed and may, in fact, be harmful. Reduction of the rate of heat supplied, in addition to providing more efficient heat use, also reduces the amount of cycling of the thermostat. That is, the thermostat that controls heater operations does not open and close its contacts as often as similar thermostats did in previous systems. The present novel system is particularly well adapted for home laundry dryers, and in that environment has the added advantage of not exposing laundry that has been partially dried to the high temperature air stream that is initially supplied when the laundry is wet. Consequently, the laundry is in little danger of being "overdried" and there is little possibility of scorching.

Although the invention has been described in connection with certain specific structural embodiments, it is to be understood that various modifications and alternative structures may be resorted to without departing from the scope of the invention as defined in the appended claims.

I claim:

1. In a laundry dryer, the combination of a pair of main heaters for supplying heat to the dryer, and electric means for controlling the heat supplied by said heaters and including a heat responsive switch operable upon a temperature in said dryer reaching respective predetermined upper and lower limits for controlling said heaters, switch means movable between an open and a closed position and biased to said open position and adapted to disable one of said heaters when open and permitting said one heater to operate when closed, an electromagnet cooperating with said switch means and energized and deenergized respectively in response to the activation and deactivation of said heaters by said heat responsive switch, and means for moving said switch means to closed position at the beginning of a drying cycle, said electromagnet being sufficiently strong to hold said switch means in closed position against said bias and insufficiently strong to move said switch means from open position to closed position against said bias, whereby both of said heaters initially supply heat to said dryer, and after said heat responsive switch has once deactivated said heaters, only the other heater supplies heat thereto.

2. In a laundry dryer, the combination of a pair of main heaters for supplying heat to the dryer, and an electric circuit having two parallel branches for controlling the heat supplied by the respective heaters, said circuit including a heat responsive switch in series with at least one of said branches, said heat responsive switch opening and closing upon a temperature in said dryer reaching respective predetermined upper and lower limits for respectively deactivating and activating the heater controlled by said one branch, switch means connected in the other of said branches in parallel with said one branch, said switch means being movable between a first position for opening said other branch and a second position for closing said other branch, said switch means being biased to said first position, and an electromagnet having its coil in series with said heat responsive switch and in parallel with said other branch, said electromagnet cooperating with said switch means and being sufficiently strong to hold said switch means in said second position and insufficiently strong to move said switch means from said first to said second position, means adapted to connect said circuit across a power source, and means for moving said switch means to said second position at the beginning of a drying cycle.

3. The combination according to claim 2 in which said means adapted to connect said circuit across a power source is a manually set timer which includes said means for moving said switch means to said second position.

4. In a laundry dryer of the type enclosed in a cabinet and having a rotatable drying drum and a loading door for providing access to the interior of the drum, the combination of a pair of main heaters for supplying heat to the dryer, an electric motor for rotating the drum and including a motor throw-out switch, and an electric circuit for controlling the heat supplied by said heaters and for operating said motor, said circuit having a first branch for controlling the heat output of one of said heaters, a second branch for controlling the heat output of the other of said heaters, and a third branch for operating said motor, said branches being in parallel with respect to each other, said circuit including a heat responsive switch in series with said first and second branches, said heat responsive switch opening and closing upon a temperature in said dryer reaching respective predetermined upper and lower limits, switch means in said first branch, said switch means being movable between an open position for disabling said one heater and a closed position for permitting said one heater to operate, said switch means being biased to said open position, and an electromagnet having its coil in series with said heat responsive switch and in parallel with said one branch, said electromagnet cooperating with said switch means and being sufficiently strong to hold said switch means in said closed position and insufficiently strong to move said switch means from said open to said closed position, a door switch connected in said third branch to stop said motor upon the opening of the door, said motor throw-out switch being connected in series with said first and second branches and in parallel with said coil for deactivating said heaters upon said motor stopping, means adapted to connect said circuit across a power source, and means for moving said switch means to said closed position at the beginning of the drying cycle.

5. The combination according to claim 4 in which said means adapted to connect said circuit across a power source is a manually set timer which includes said means for moving said switch means to said closed position.

6. The combination according to claim 4 in which said means adapted to connect said circuit across a power source is an electrically driven timer, the driving mechanism thereof being connected in said circuit in series with said door switch, whereby upon the opening of said door said driving mechanism is stopped.

7. In a laundry dryer, the combination of a pair of main heaters for supplying heat to the dryer, manually set timer means for starting operation of said heaters at the beginning of a drying cycle, thermostat means operable to deactivate and activate at least one of said heaters upon a temperature in said dryer reaching respective predetermined upper and lower limits, and means responsive to said thermostat means for disabling the other of said heaters for the remainder of the drying cycle upon the first operation of said thermostat means, said timer means coacting with said disabling means to set said disabling means when said timer means starts operation of the dryer, said timer means being connected to continuously operate from the beginning to the end of the drying cycle and operable to deactivate said one heater after the passage of a preselected period of dryer operation.

8. In a laundry dryer, the combination of a pair of main heaters for supplying heat to the dryer, manually set timer means for starting operation of said heaters at the beginning of a drying cycle, thermostat means operable to deactivate and activate at least one of said heaters upon a temperature in said dryer reaching respective predetermined upper and lower limits, and means responsive to said thermostat means for disabling the other of said heaters upon an operation of said thermostat means, said disabling means comprising a normally open switch closed by said timer means at the beginning of said cycle, and means for holding said switch closed to permit said timer to disengage said switch, said holding means being responsive to said thermostat means and releasing said switch upon operation of said thermostat, said timer means being connected to continuously operate from the beginning to the end of the drying cycle and operable to deactivate said one heater after the passage of a preselected period of dryer operation.

9. In a laundry dryer, the combination of a pair of main heaters for supplying heat to the dryer, and electric means for controlling the heat supplied by said heaters and including manually set timer means for starting operation of said heaters at the beginning of a drying cycle, a heat responsive switch connected to deactivate and activate at least one of said heaters upon a temperature in said dryer reaching respective predetermined upper and lower limits, switch means movable between an open and a closed position, said switch means being biased to one of said positions and connected to disable the other of said heaters when in said one position and permitting said other heater to operate when in the other of said positions, said timer means including means for moving said switch means to said other position at the beginning of said cycle and shortly thereafter releasing said switch means, and means for holding said switch means in said other position after said switch means is released by said moving means, said holding means being responsive to operation of said heat responsive switch and releasing said switch means when said heat responsive switch deactivates said heaters.

10. The combination according to claim 9 in which said means for moving said switch means to said other position comprises a rotatable cam having a radial projection thereon, said cam being disposed adjacent said switch means with said projection in position to force said switch means to said other position for retention by said holding means as said timer means is set and thereafter being rotated by said timer means out of contact with said switch means as the drying cycle progresses and before said heat responsive switch operates to deactivate said heaters, said holding means retaining said switch means in said other position after said cam has released said switch means and until said heat responsive switch operates.

11. The combination according to claim 9 and including a manually operable switch connected intermediate said switch means and said one heater for disabling said one heater, whereby said dryer may be selectively operated with both heaters activated or with only said other heater activated during said cycle.

12. In a laundry dryer of the gas heated type, the combination of two main gas burners for supplying heat to the dryer, two main valves for controlling the gas flow to the respective burners, each of said valves having a solenoid for effecting the opening thereof, an electric control circuit for said solenoids, timer means in said circuit for energizing said solenoids for starting operation of said burners at the beginning of a drying cycle, a heat responsive switch connected in series with one of said solenoids to open and close its associated valve upon a temperature in said dryer reaching predetermined upper and lower limits, and means responsive to the operation of said heat responsive switch for disabling for the remainder of the drying cycle the other of said solenoids upon said heat responsive switch deenergizing said one solenoid, said timer means coacting with said disabling means to set said disabling means when said timer starts operation of the heaters, said timer means being connected to continuously operate from the beginning to the end of said cycle and operable to deenergize said one solenoid after the passage of a preselected period of dryer operation.

13. In a laundry dryer of the gas heater type, the combination of two main gas burners for supplying heat to the dryer, two main valves for controlling the gas flow to the respective burners, each of said valves having a solenoid for effecting the opening thereof, an electric control circuit for said solenoids, said solenoids being connected in parallel branches in said circuit, manually set timer means for energizing said solenoids for starting operation of said burners upon being set, a heat responsive switch connected in said circuit in series with both of said parallel branches for opening and closing said branches upon a temperature in the dryer reaching respective predetermined upper and lower limits, and switch means connected in series in one of said branches, said switch means being responsive to operation of said heat responsive switch and operable to open said one branch upon opening of said heat responsive switch, said switch means thereafter maintaining said one branch open, said timer means cooperating with said switch means to close said switch means when said timer means is set, said timer means being connected to continuously operate from the beginning to the end of the cycle and operable to deactivate the other of said branches after the passage of a preselected period of dryer operations.

References Cited in the file of this patent

UNITED STATES PATENTS

| 2,307,294 | Persons | Jan. 5, 1943 |
| 2,621,423 | Clark | Dec. 16, 1952 |
| 2,678,814 | Geldhof et al. | May 18, 1954 |
| 2,769,246 | Shapter | Nov. 6, 1956 |
| 2,789,367 | Mayhan | Apr. 23, 1957 |
| 2,819,540 | Toma et al. | Jan. 14, 1958 |
| 2,827,276 | Racheter | Mar. 18, 1958 |